Figure 1:
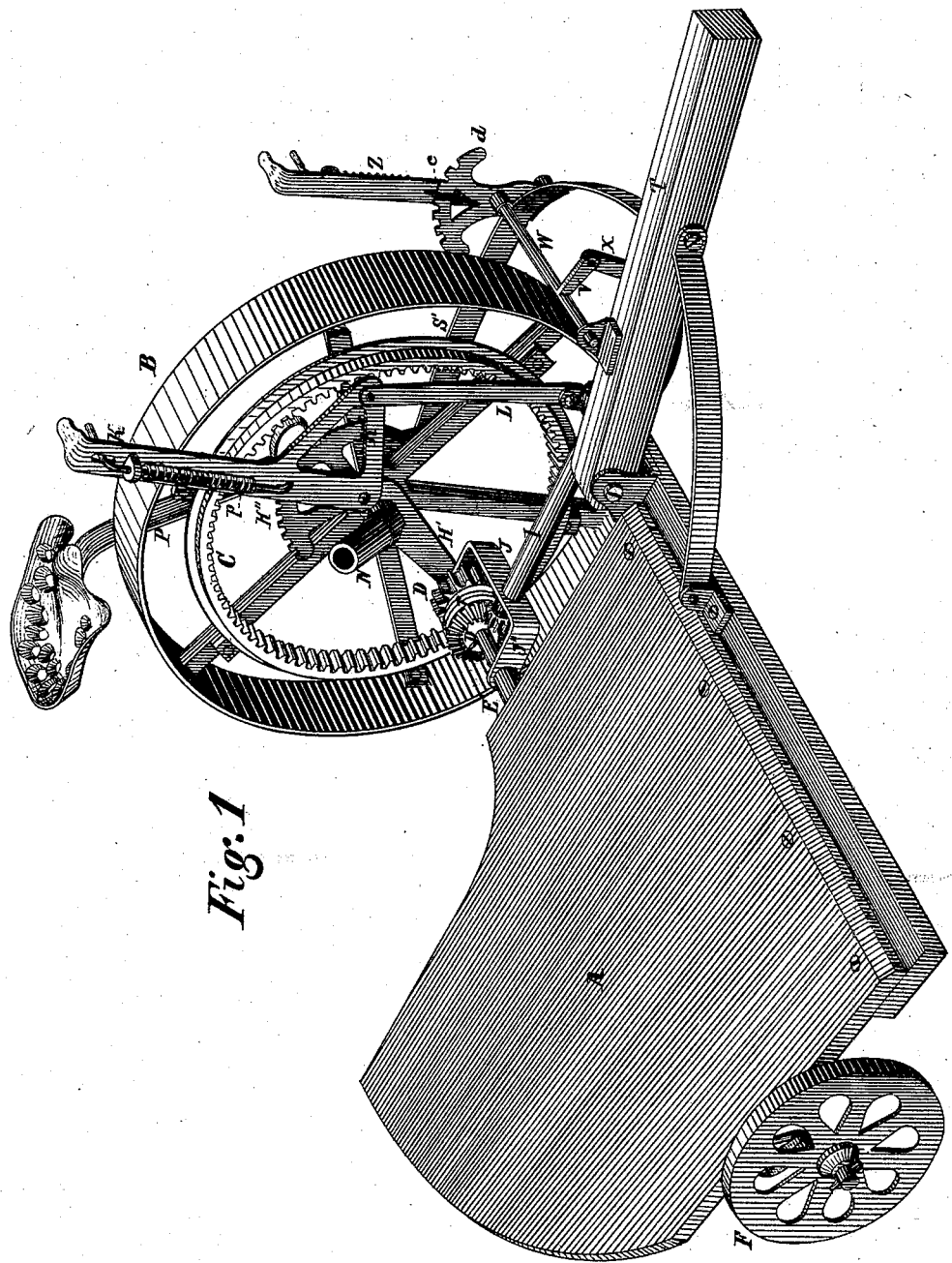

3 Sheets—Sheet 1.

S. JOHNSTON.
Harvesting-Machine.

No. 216,960. Patented July 1, 1879.

Witnesses:
W. R. Wright
Joel Zane Jr

Samuel Johnston
by his Attorney
George Harding

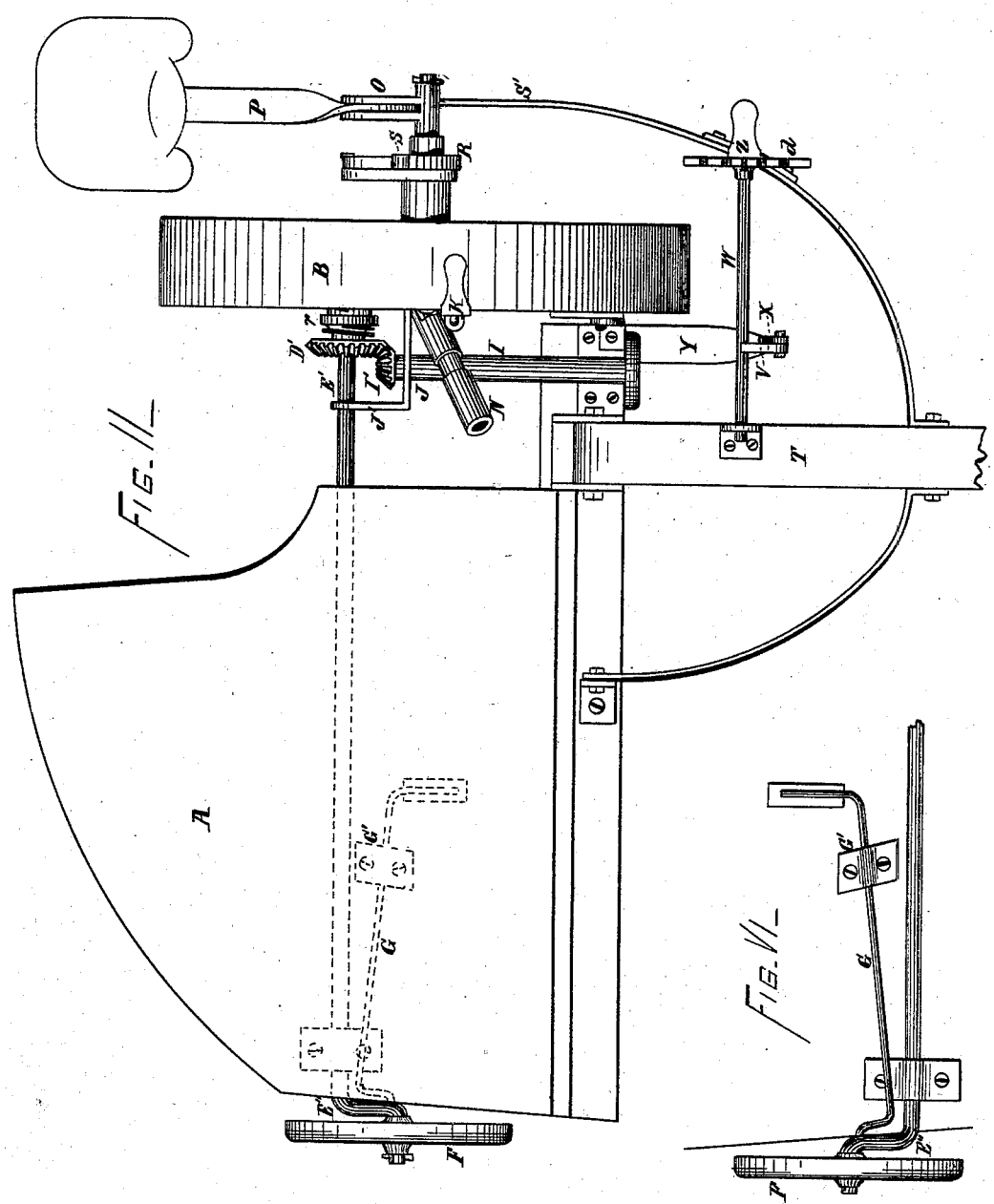

S. JOHNSTON.
Harvesting-Machine.
No. 216,960.  Patented July 1, 1879.
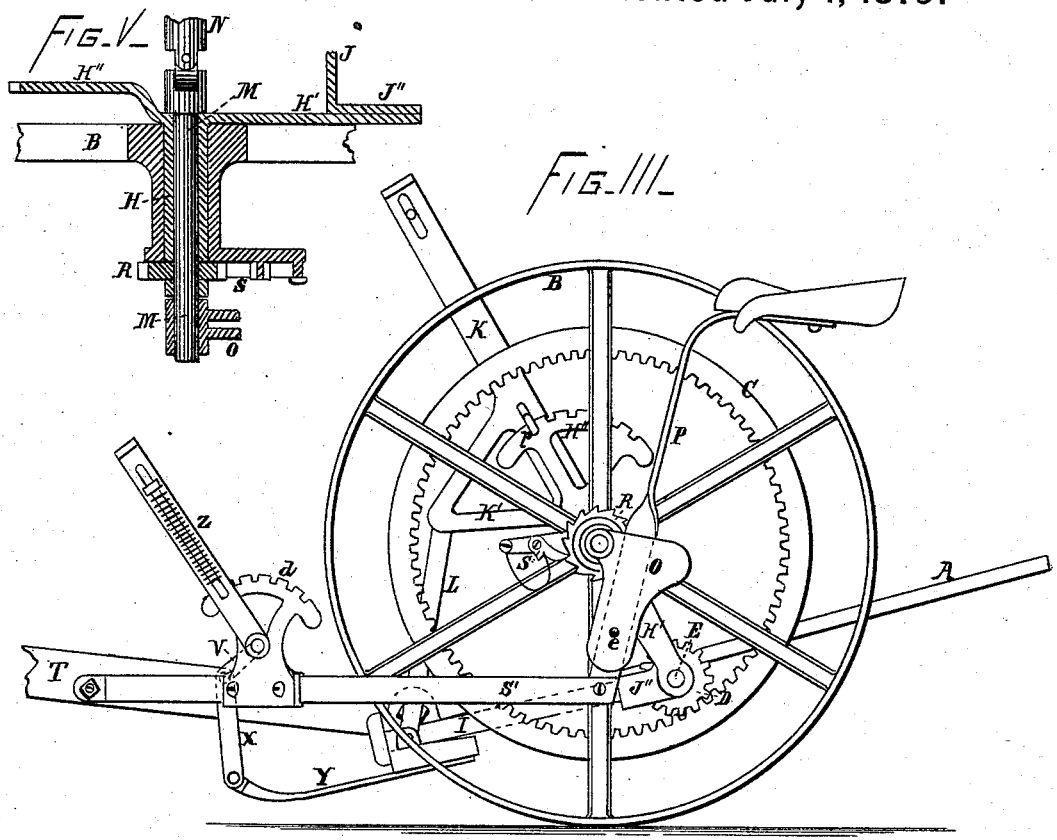
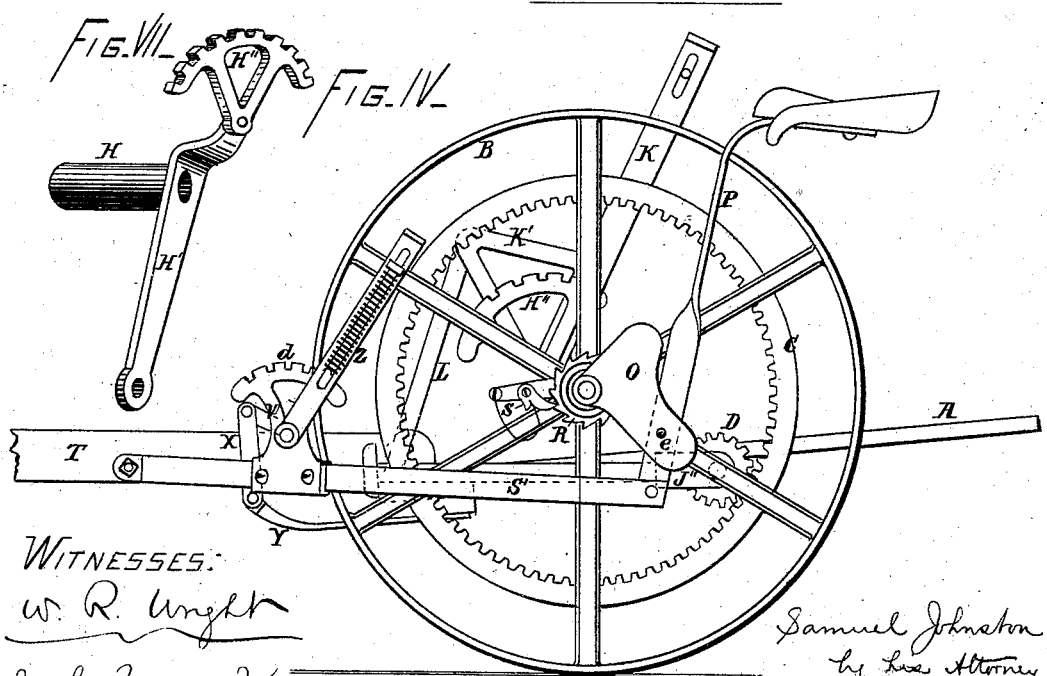
Witnesses:
W. R. Wright
Joel Zane Jr
Samuel Johnston
by his Attorney
George Harding

UNITED STATES PATENT OFFICE.

SAMUEL JOHNSTON, OF BROCKPORT, NEW YORK.

IMPROVEMENT IN HARVESTING-MACHINES.

Specification forming part of Letters Patent No. 216,960, dated July 1, 1879; application filed December 4, 1878.

*To all whom it may concern:*

Be it known that I, SAMUEL JOHNSTON, of Brockport, in the county of Monroe and State of New York, have invented a new and useful Improvement in Harvesting-Machines, of which I hereby declare the following to be a full, clear, and exact description, reference being had to the accompanying drawings, which form part of this specification, and in which—

Figure 1 is a perspective view of such part of a harvesting-machine as is necessary to illustrate my improvement. Fig. 2 is a plan view of the same; Figs. 3 and 4, side elevations; Fig. 5, a longitudinal sectional view of the hub and axle of the driving-wheel and adjoining mechanism; Fig. 6, a detached view of part of the under side of the platform, showing the manner of connecting the spring G to the shaft E, and Fig. 7 a perspective view of the device for suspending the platform from the main wheel.

Similar letters of reference indicate corresponding parts in all the figures.

My invention consists of devices whereby the platform of a harvesting-machine can be raised at both the inner and outer ends at the same time and by the same operation.

It also consists of an organization of devices for enabling the driver to tilt the platform.

It also consists of devices which cause the driver's seat to remain at nearly the same height from the ground and in nearly the same horizontal position, and to be independent of any change given to the height or inclination of the platform.

In the drawings, A is the platform, and B the driving-wheel, of a harvesting-machine. C is an internal gear rigidly attached to the spokes of the driving-wheel.

A shaft, E E' E'', runs across and beneath the platform, from the driving-wheel to the grain-wheel, the outer end, E'', of which shaft is bent into the form of a crank, as shown at E'' in the drawings, and the grain-wheel F is there mounted for the purpose of supporting the outer end of the platform.

Below the platform there is a torsion-spring bar, G, one end of which is fixed to the bent end E'' of the shaft E E' E'', and the other end, passing through the bearing G', rests against the under side of the platform.

The inner end, E, of the shaft E E' E'' is supported by a compound crank-piece, composed of a hollow central stem, H, a radial arm, H', and a segmental rack-piece, H'', permanently united together, as shown in perspective in Fig. 7, which represents this compound crank-piece detached from the machine, while Fig. 5 shows the same in section and in its place with reference to the other parts of the machine, which are immediately connected with it.

On the inner face of the segmental rack-piece H'', and at the center of the segment, a bent lever, K K', is pivoted at the fulcrum of said lever. To the arm K' of this bent lever a suspension-rod, L, is pivoted. The lower end of this rod L is attached by a pivot to the inner end of the finger-bar.

The inner end, E, of the shaft E E' E'' is rigidly attached to the outer extremity of the arm H' of the crank-piece H H' H''.

To the arm K of the bent lever K K' is attached a spring-pawl, p, which catches into the teeth of the segmental rack-piece H''.

The organization of parts just described has for its object the supporting of the shaft E E' E'', so that the shaft, together with the platform which rests upon it, can be elevated or depressed equally throughout its entire length by means of the hand-lever K K'. This arrangement of the shaft E E' E'', in combination with the crank-piece H H' H'', is made use of to support the crank-shaft I, and also the gearing by which said crank-shaft is made to drive the cutting apparatus, as follows: A portion of the shaft E E' E'', between E and E', is journaled, so as to permit it to carry and support a vibrating yoke-piece, J J' J''. The arms J' J'' of this yoke-piece are fitted loosely upon the shaft E E' E'', so as to vibrate thereon. The tube in which the crank-shaft I, which drives the cutting apparatus, revolves is supported at one end by the cross piece or head J of the yoke.

The cutting apparatus is driven by the pinion D, which meshes into the internal gear C on the main wheel, and revolves upon the inner end of the shaft E E' E'' as a journal. This pinion D, by a spring-clutch attachment, r, is made to turn the bevel-pinion D' when the machine advances. This bevel-pinion D' also turns upon the journaled part of the shaft E E' E'', and gears into a bevel-pinion, I', upon the end of the crank-shaft I.

A short shaft, M, extends through the hollow stem H of the crank-piece, and to the inner end of this shaft a short tumbling-shaft, N, is attached. This tumbling-shaft is to be joined by gearing to a rake-head, for the purpose of revolving the rake. On the shaft M, beyond the hub of the drive-wheel, a ratchet-wheel, R, is rigidly secured, into which fits a spring-pawl, S, which pawl is attached to the outer end of the hub of the drive-wheel, so that as the machine moves forward the drive-wheel will revolve the shaft M and the tumbling-shaft N, the reverse motion of the drive-wheel allowing the shaft M to remain at rest. This shaft M is prolonged outwardly sufficiently beyond the hub of the driving-wheel to furnish a support for the vibrating socket O, to which the seat-spring P is attached in the following manner: The seat-spring P is fitted so as to vibrate in the socket O, and is pivoted thereto at the point e. The lower end of the seat-spring is pivoted to a curved brace, S', which extends and is secured to the tongue T. From this curved brace to the tongue there extends a short rock-shaft, W, having an arm, V, projecting from it. At the outer end of this rock-shaft W there is pivoted a rod, X, which is, in turn, pivoted to the upper end of a curved shoe, Y, which shoe Y is rigidly attached at the other extremity to the finger-bar.

By means of this combination and arrangement the platform can be rocked by the hand-lever Z upon the main hub of the drive-wheel and the axis of the grain-wheel as centers, so as to assume any desired angle with the ground, and by means of the spring-pawl c, attached to the hand-lever Z, and the segmental rack d can be held at any desired angle.

The operation of the several parts of my machine is as follows: When the driver wishes to raise the whole platform from the ground, he removes pawl p, attached to the hand-lever K K', from the detent of the rack-segment H'' and turns it toward the rear of the machine. When he wishes to lower the whole platform, he turns the lever K K' toward the front of the machine, and by allowing the pawl p to drop into the rack-segment H'' he can sustain the platform at any desired height. The torsion-spring bar G is so secured to the platform and bent portion E'' of the shaft E E' E'' that the platform can be raised by exercising but a small amount of strength. When it is desired to tilt the platform or change the angle of inclination, he removes the lever Z to the front or rear, and can thus change the angle of the platform at pleasure, and by means of the pawl attached to said lever Z secure it at any desired angle.

The manner of attaching the seat preserves its position from the ground uniformly, and also preserves it in a horizontal position, whatever may be the height of the platform or its angle to the ground. In Figs. 3 and 4 the platform is shown respectively at the lowest and highest positions it can assume, with the position of the driver's seat at both positions of the platform.

What I claim as my invention, and desire to secure by Letters Patent of the United States, is—

1. In a harvesting-machine, the combination of the crank H H' H'' and shaft E E' E'' with the hub of the main wheel and the grain-wheel, substantially as and for the purpose set forth.

2. The combination of the crank H H' H'', shaft E E' E'', the main wheel, and grain-wheel with the elevating-lever K K', substantially as described.

3. The combination of the rock-shaft W, brace-piece S', hand-lever Z, shoe Y, and finger-bar, for the purpose of tilting or rocking the platform, as before described.

4. The combination of the brace S', vibrating socket O, seat-spring P, and supporting-shaft M, substantially as and for the purpose described.

5. The yoke-piece J J' J'', loosely attached to the shaft E E' E'', in combination with the crank-shaft I, arranged to drive the cutting apparatus, substantially as shown and described.

6. The torsion-spring bar G, so arranged, in combination with the shaft E E' E'', as to assist in elevating the platform, substantially as shown and described.

SAML. JOHNSTON.

Witnesses:
JOHN H. KINGSBURY,
W. R. WRIGHT.